(No Model.)
G. N. TODD.
COTTON PICKING DEVICE.
No. 423,536. Patented Mar. 18, 1890.
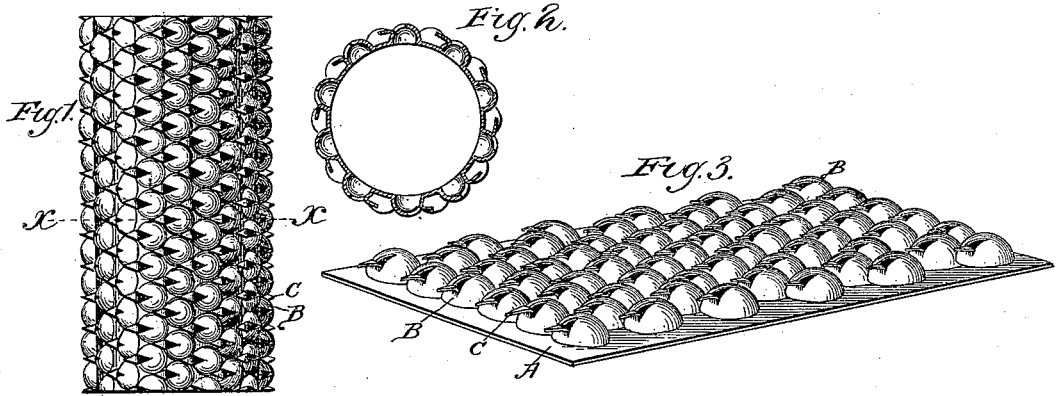
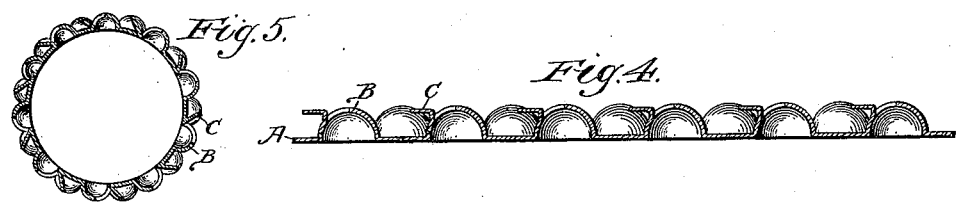
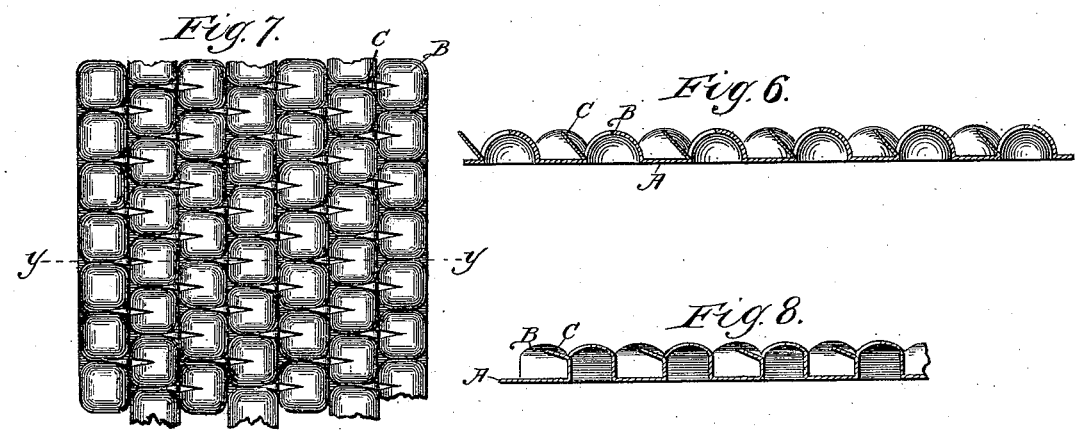
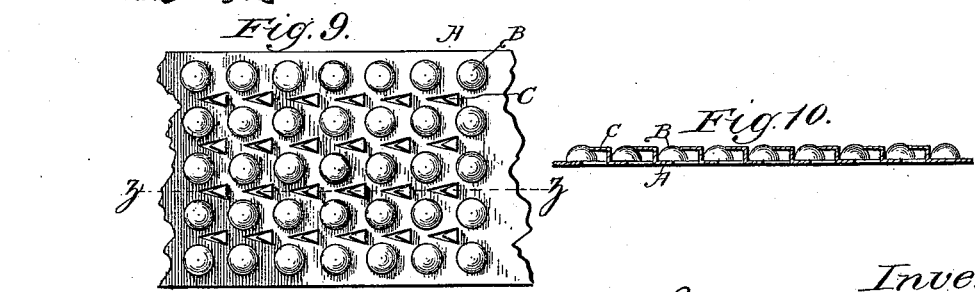
Witnesses.
Will R. Onohundro
Howard Hallock
Inventor.
George N. Todd
By, Jno. G. Elliott
Atty.

UNITED STATES PATENT OFFICE.

GEORGE N. TODD, OF CHICAGO, ILLINOIS, ASSIGNOR TO THE TODD COTTON HARVESTER COMPANY, OF ILLINOIS.

COTTON-PICKING DEVICE.

SPECIFICATION forming part of Letters Patent No. 423,536, dated March 18, 1890.

Application filed May 9, 1885. Serial No. 164,875. (No model.)

*To all whom it may concern:*

Be it known that I, GEORGE N. TODD, a citizen of the United States, residing in Chicago, county of Cook, and State of Illinois, have invented certain new and useful Improvements in Cotton-Picking Devices, of which the following is a specification.

This invention relates to improvements in cotton-picking devices in which a series of cotton-picking teeth project between a series of blunt projections rising on a plane with or above the teeth and constituting guards to protect the teeth and perform the more important function of preventing injury to the cotton bush by warding off the limbs, leaves, and boll from the teeth while gathering the cotton from the boll.

The principal objections to the prior constructions, in which the picker device is composed of strips of sheet metal arched transversely and indented or recessed for the accommodation of wire teeth soldered or otherwise affixed thereto, are the cost and waste of material, and the liability to pull apart a picking device composed of numerous sections, which sections in themselves restrict the area of a picking device—as, for example, a foundation may be of an area too small for five sections and too large for four sections—a matter of considerable importance when cylindrical foundations are employed; and it may here be observed that any picking device where the teeth are cut out of one edge and having formed therewith guards is necessarily made up of sections, and the width of each of these sections limited to avoid having too much space between the teeth and guard.

The objects of this invention are to avoid these several and other objections by forming the teeth and guards in such a manner that a picking-surface provided with guards may be formed of any dimension and without any restriction as to the proximity of the teeth to the guards or the relative arrangement of the guards themselves, and to produce in a simple manner from a single sheet of metal an entire picking device of such a character that a cotton bush will be protected from injury and the picking-teeth successfully operate under every condition.

Another object is to form a picking device of sheet metal, having a series of projections or guards thereon, with teeth formed integral with said projections, the surface of which projections when the sheet is bent into a cylinder shall form the outer periphery thereof.

Further objects are to produce an effective picking device from sheet metal without any waste of material whatever, and, finally, to provide certain details of construction shown and hereinafter described.

These objects are attained by devices illustrated in the accompanying drawings, in which—

Figure 1 represents a picking device embodying my invention and having a cylindrical form—as, for example in a picker-stem; Fig. 2, a transverse section of Fig. 1 on the line $x\ x$; Fig. 3, a perspective of a flat but otherwise similar device to that shown in Figs. 1 and 2; Fig. 4, a section of the same, taken lengthwise through the picking-teeth; Fig. 5, a transverse section of a cylinder having a picking device embodying my invention, but with the teeth cut down to the base of the guards and bent away from the same on a line at an oblique angle to the picking device; Fig. 6, a section of a similar but flat picking device; Fig. 7, a plan view of another form of my invention in which there is a variation in the form of the guards and their proximity to each other; Fig. 8, a transverse section of the same on the line $y\ y$ of Fig. 7; Fig. 9, a plan view of another form of my invention in which the teeth are formed separate from the guards and there is a variation in the relative position of the guards to each other and to the teeth; Fig. 10, a transverse section of the same on the line $z\ z$, Fig. 9.

Similar letters of reference indicate the same parts in the several figures of the drawings.

In all the figures of the drawings, A indicates a single sheet of metal of any dimension, great or small, adapted to form an entire and continuous picking device. This sheet of metal has raised out of it, by stamping or other convenient or well-known process, a series of guards B, and is provided with a series of teeth C, formed by cutting the metal so that the shanks of the teeth are integral with the sheet. All of the guards upon a single picking device are of uniform size, shape, distance apart, and relative arrangement in series.

As shown in Figs. 1 to 6, inclusive, and also in Figs. 9 and 10, the guards are hemispherical, which form is deemed preferable because dirt and other foreign substances are not as liable to accumulate between them, and that this or substantially the same form is less liable to injure any part of the cotton-bush by friction or otherwise. The guards may, however, have rounded tops and straight cylindrical sides, as shown in Figs. 7 and 8.

As shown in Figs. 1 to 8, inclusive, teeth C are cut out of the guards and may be, as shown in Figs. 1 to 4, inclusive, and also Figs. 7 and 8, bent over backward, so that their points extend in a line substantially parallel with the plane of the picking device, in which case the shank of the tooth terminates at a point about midway the tip and base of the guard out of which it is formed.

In Figs. 5 and 6 the teeth are shown as extending in a line obliquely to the plane of the picking device, and for this purpose are preferably cut down to the base of the guards. It may here be stated, however, that teeth which extend in a line parallel to the plane of the picking device are preferable because they are less liable to injure a cotton-bush and are more conveniently and effectively wiped to discharge their accumulation of cotton, and besides better resist strains tending to bend and warp them.

When the teeth are cut out of the guards, as above described, said guards are preferably arranged in rows, the series of each row alternating with the next adjacent row, for by this arrangement three guards serve to effectually guard one or more teeth and to ward off limbs and leaves coming in contact with them from as many directions, which they do during the picking of cotton from the bush. The teeth, however, may be cut out of the sheet of metal at a point removed from the guards, as shown in Figs. 9 and 10, and in such case the guards are not in series alternating with each other, so that the tooth is guarded at four points, while the guards are further separated from each other and the teeth than would be practical when the teeth are cut out of the guards.

The formation of a picking device of sheet metal having projections or guards struck upon the surface thereof, with teeth formed integral with said projections, is of special value and utility in the formation of cotton-picker stems, for when the sheet of metal is bent into the form of a cylinder the projections will form the outer periphery thereof and thereby effectually prevent injury to the limbs or bolls of a cotton-plant. The particular form of teeth is not essential, for the point thereof may be either single or double, or the tooth may have any number of points projecting from the same body, and therefore the number and diversity of such teeth, so long as they are formed integral with the projections or sheet, may be as great as that of the projections, and hence I desire to claim, broadly, a picking device having a series of projections forming the outer periphery or highest surface thereof, with teeth formed integral therewith.

In conclusion it may be stated that sheet metal is particularly desirable for a cotton-picking device because it can be readily conformed to a backing having any irregular as well as regular configuration, is readily manipulated to form a most desirable form of picking device, and is so cheap that when the teeth become injured it is economy to substitute a new plate rather than attempt to repair the injured one, which substitution results in saving considerable valuable time and labor.

I am aware that prior to my invention it was old to have picker-stems constructed of strips of sheet metal arched transversely and having cut therein slots at each side of which the metal is indented or recessed, in which recesses wire teeth are secured by soldering or brazing, the said teeth being bent in arched form to lie in the slot and curved so that their pointed ends lie in a level with or below the outer surface of said strips, whereby the strips are designed to serve as guards for preventing the leaves or branches of the cotton-plant engaging the teeth, but not to prevent the cotton in the bolls from being engaged by the teeth. This prior construction, however, is essentially different from my invention as before set forth, for the reason that there is not a series of projections as I have shown and described, nor are the teeth formed integral with the metal of the plate, and therefore no portion of the plate is utilized for teeth.

Having described my invention, what I claim, and desire to secure by Letters Patent, is—

1. A cotton-picking device having a surface consisting of sheet metal having integral teeth and a series of hemispherical-like guards or projections stamped or struck up thereon, said projections when the sheet is bent into a cylinder forming the outer periphery thereof, substantially as described.

2. A cotton-picking device having a surface provided with a series of guards having a hemispherical-like form and a series of teeth alternating with said guards, substantially as described.

3. A cotton-picking device having a surface provided with a series of guards having a hemispherical-like form and a series of teeth cut out of said guards, substantially as described.

GEORGE N. TODD.

Witnesses:
JNO. G. ELLIOTT,
W. W. ELLIOTT.